United States Patent
Dungarwal et al.

(10) Patent No.: US 11,263,047 B2
(45) Date of Patent: Mar. 1, 2022

(54) METADATA MANAGEMENT FOR MULTI-CORE RESOURCE MANAGER

(71) Applicant: SAP SE, Walldorf (DE)

(72) Inventors: Piyush Dungarwal, Pune (IN); Dheren Gala, Pune (IN); Tony Imbierski, Hampshire (GB)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 15/897,519

(22) Filed: Feb. 15, 2018

(65) Prior Publication Data
US 2019/0250948 A1    Aug. 15, 2019

(51) Int. Cl.
G06F 9/50    (2006.01)

(52) U.S. Cl.
CPC .............. *G06F 9/50* (2013.01); *G06F 9/5016* (2013.01); *G06F 2209/5011* (2013.01); *G06F 2209/5018* (2013.01)

(58) Field of Classification Search
CPC .. G06F 9/50; G06F 9/5016; G06F 2209/5011; G06F 2209/5018
See application file for complete search history.

(56) References Cited

U.S. PATENT DOCUMENTS

| | | | | |
|---|---|---|---|---|
| 5,809,268 A | * | 9/1998 | Chan | G06F 9/3836 712/200 |
| 7,693,886 B1 | * | 4/2010 | Novick | G06F 16/9574 707/614 |
| 10,218,589 B1 | * | 2/2019 | Matthews | H04L 43/0817 |
| 2002/0114272 A1 | * | 8/2002 | Stewart | H04L 43/0817 370/218 |
| 2007/0286071 A1 | * | 12/2007 | Cormode | H04L 43/16 370/229 |
| 2009/0154486 A1 | * | 6/2009 | Archer | H04L 43/022 370/445 |
| 2012/0144170 A1 | * | 6/2012 | Singh | G06F 9/526 712/223 |
| 2012/0159502 A1 | * | 6/2012 | Levin | G06F 9/5016 718/104 |
| 2016/0241455 A1 | * | 8/2016 | Novak | H04L 43/06 |

OTHER PUBLICATIONS

Keralapura et al. "Communication-efficient distributed monitoring of thresholded counts", In Proceedings of the 2006 ACM SIGMOD international conference on Management of data pp. 289-300. (Year: 2006).*

* cited by examiner

*Primary Examiner* — Meng Ai T An
*Assistant Examiner* — Willy W Huaracha
(74) *Attorney, Agent, or Firm* — Schwegman Lundberg & Woessner, P.A.

(57) ABSTRACT

Various examples are directed to systems and methods for managing resources in a multi-core computing system. A first thread executing at a first core of a multi-core processor unit may allocate a first element of a resource. The first thread may increment a first thread counter for a first metric describing the resource. The first thread may determine that the first thread counter is greater than a first thread counter threshold and update a first metric global value based at least in part on the first thread counter. The first thread may also reset the first thread counter.

20 Claims, 8 Drawing Sheets

METADATA MANAGEMENT FOR MULTI-CORE RESOURCE MANAGER

TECHNICAL FIELD

This document generally relates to methods and systems for use with computer devices, including networked computing devices. More particularly, this document relates to systems and methods for efficiently managing metadata describing computer resources in a multi-core environment.

BACKGROUND

Some computing devices are arranged with a multi-core architecture that includes multiple processor unit cores. A multi-core architecture is often used to execute software applications that include multiple concurrent threads. Resources in the system, such as memory, can be allocated to a particular thread or can be part of a global pool that can be allocated to any of a group of threads. A resource manager typically maintains metadata that describes the usage of system resources.

BRIEF DESCRIPTION OF DRAWINGS

The present disclosure is illustrated by way of example and not limitation in the following figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for managing metadata in a resource manager for computing devices that utilize a multi-core architecture. A multi-core architecture is an arrangement for a computing device that includes more than one processor unit core. A multi-core architecture can execute software applications that include multiple concurrent threads, where each thread executes a program task. Threads execute in parallel. In a well-designed system, parallel threads can increase system speed and efficiency. In practice, however, multiple parallel threads can create complexities in resource management.

In a multi-core architecture, resources, such as memory, disk storage, etc., may include thread-local elements that are allocated to specific threads as well as global pools shared by different threads. A resource manager maintains resource metadata describing the state of the system resources. For example, in the context of system memory, the resource manager may maintain data describing various metrics such as the total amount of used memory, the total amount of free memory, the number of allocated memory elements, the number of free memory elements, the number of local or thread-level memory elements, the number of global memory elements, etc.

It is sometimes desirable for individual threads to use current values for resource metrics. For example, a thread that uses a global memory pool for caching may check the utilization of the global memory pool to make decisions on which data to cache or evict from the cache. In another example, a resource manager maintains a high or low water mark for a resource metric. The resource manager may frequently check the value of the metric to detect high and low values.

Multiple threads accessing the same resource metric value can cause coordination issues in the multi-core architecture. For example, multiple threads may maintain a cached value for a given resource metric. If one thread causes an update to the resource metric value, the cached value of the metric at other threads becomes invalid, requiring the other threads to obtain the new, updated resource metric value. Some examples address this coordination problem by updating the global value for a resource metric only when a global value is needed. For example, each thread maintains a local metric value for a resource metric. When a thread takes an action that changes the value of the resource metric, the thread updates its own local value, but does not update the global value. Other threads act in the same way. When a thread has need to read the current value of the resource metric, all of the local values are consolidated with a previous value of the resource metric to generate a current global value. This reduces the inter-thread coordination to update the resource metric; however, the cost of consolidating the local counters can still be high.

Various examples address resource metric coordination using independent local thread counters. Each thread maintains a thread counter, where the value of the thread counter reflects a change from the last global value for the resource metric in view of the thread's own actions. If the value of a thread's local counter becomes too large, the thread updates the global value of the resource metric and resets its thread counter. To illustrate, consider an example resource metric describing the utilization of a global memory pool. A last global value for the resource metric may indicate that X memory elements of the global memory pool are allocated (e.g., across all threads). A thread may receive an allocation of Y memory elements, and in response begin a thread counter with a value of Y. If Y is greater than a thread counter threshold for the thread, then the thread updates the global value to X+Y and resets its thread counter.

In this way, the most recent global value for the resource metric includes less than an allowable error, e.g., the sum of the thread counter thresholds across the threads that are caching the resource metric. Accordingly, it may not be necessary to consolidate all of the thread counters each time that a thread is to use the value of the resource metric. Instead, in some examples, a thread uses the most recent global value for the metric with the knowledge that the most recent global value can be off by as much as the allowable error. Although this may reduce the accuracy of resource metrics, it has the potential to greatly reduce the system resources used for coordinating metadata between threads.

Figure 1:
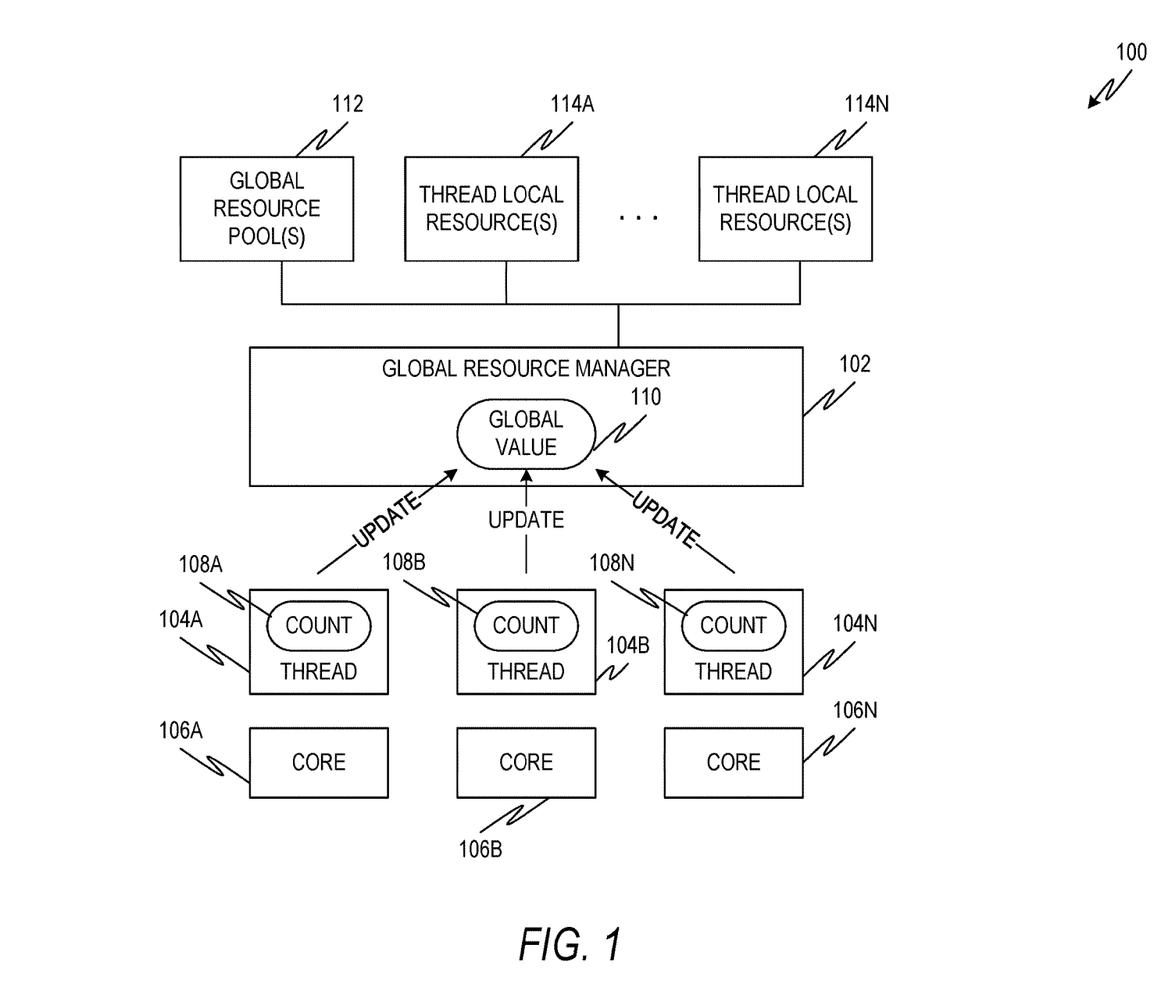
FIG. 1 is a diagram showing one example of an environment for managing metadata at a global resource manager.

FIG. 1 is a diagram showing one example of an environment 100 for managing metadata at a global resource manager 102. The environment 100 may be or include a single computing device, such as a server, or multiple, networked computing devices. The environment 100 includes multiple processor unit cores 106A, 106B, 106N. The processor unit cores 106A, 106B, 106N may be part of a common die or chip or may be distributed across multiple dies or chips. Depending on the processor configuration used, the processor unit cores 106A, 106B, 106N may include dedicated hardware resources, such as cache memory, etc., pooled hardware resources, or both. In the environment 100, the different cores 106A, 106B, 106N are shown executing distinct threads 104A, 104B, 104N of a software application.

The environment 100 also includes resources 112, 114A, 114N that include a global resource pool 112 and one or more thread-local resource pools 114A, 114N. The resources 112, 114A, 114N may include any suitable resources in the computing system such as, for example, memory elements, disk storage elements, cache memory addressable by multiple cores 106A, 106B, 106N, etc. Some resources are organized into a global resource pool, such as the global resource pool 112. Elements of the global resource pool 112 may be allocated to more than one of the threads 104A, 104B, 104N. Other resource elements are organized into the thread-local resource pools 114A, 114N. The thread-local resource pools 114A, 114N include resource elements that are to be allocated only to a particular thread.

A global resource manager 102 is executed at the multi-core architecture, for example, at one or more of the processor unit cores 106A, 106B, 106N. The global resource manager 102 maintains a global value 110 for a resource metric. The resource metric may be any suitable metric describing the use of a computing system resource. Example resource metrics that may be reflected in the global value 110 include the total amount of used memory, the total amount of free memory, the number of allocated memory elements, the number of free memory elements, the number of local or thread-level memory elements, the number of global memory elements, etc.

The threads 104A, 104B, 104N maintain local thread counters 108A, 108B, 108N. The thread counters 108A, 108B, 108N indicate the change to the global value 110 of the resource metric that has been made by each respective thread 104A, 104B, 104N since the last time that the thread 104A, 104B, 104N updated the global value 110 of the resource metric. For example, when a thread 104A, 104B, 104N takes an action that causes a change to the resource metric, it modifies its thread counter 108A, 108B, 108N to reflect the change. If the modification causes the value of the thread counter 108A, 108B, 108N to exceed a thread counter threshold for the thread 104A, 104B, 104N, then the thread 104A, 104B, 104N updates the global value 110 of the resource metric and resets its thread counter 108A, 108B, 108N.

As described herein, this may reduce the system resources necessary for maintaining the resource metric. For example, in the environment 100, the global value 110 is not updated every time that a thread 104A, 104B, 104N takes an action that would cause the resource metric to change. Instead, threads 104A, 104B, 104N can take actions that modify the resource metric without updating the global value 110 so long as the action does not cause the thread's thread counter 108A, 108B, 108N to exceed the thread counter threshold for that thread. Further, the global value 110 may not be updated every time that a thread 104A, 104B, 104N or the global resource manager 102 needs to read the resource metric. Instead, as described herein, the threads 104A, 104B, 104N and/or global resource manager 102 reads and/or uses the current global value 110 because it is known to be within the allowable error of the actual resource metric value. In addition, even when a thread 104A, 104B, 104N does cause an update to the global value 110, the update may not require coordinating or consolidating values from multiple threads 104A, 104B, 104N. For example, when a thread 104A, 104B, 104N updates the global value 110, it may do so based on its own thread counter 108A, 108B, 108N without reading (or having the global resource manager 102 read) the thread counters 108A, 108B, 108N of other threads.

Although FIG. 1 and much of the description herein describes a global value 110 and thread counters 108A, 108B, 108N describing a single resource metric, the environment 100 may simultaneously track multiple resource metrics in the manner described herein. For example, the global resource manager 102 may include additional global values, and the threads 104A, 104B, 104N may maintain additional thread counters for one or more additional resource metrics.

Figure 2:
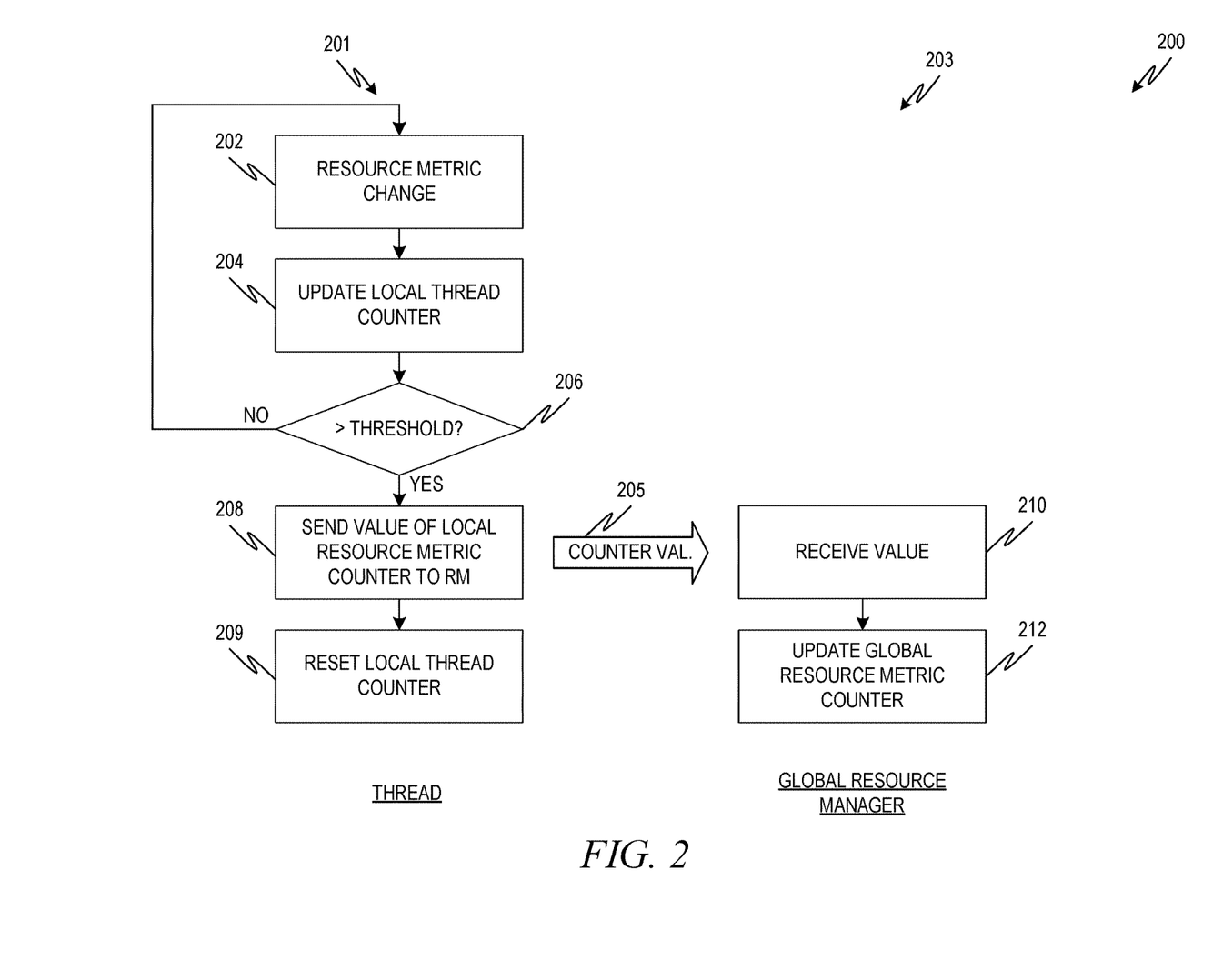
FIG. 2 is a flow chart showing one example of a process flow that may be executed by the global resource manager and a thread to manage metadata in a multi-core architecture.

FIG. 2 is a flow chart showing one example of a process flow 200 that may be executed by the global resource manager and a thread to manage metadata in a multi-core architecture. For example, the process flow 200 may be executed by the global resource manager 102 and one of the threads 104A, 104B, 104N. The process flow 200 includes two columns 201, 203. Column 201 includes operations that may be executed by the thread. Column 203 includes operations that may be executed by the global resource manager 102.

At operation 202, the thread takes an action that causes a change in a resource metric. Any suitable action may be used. For example, the thread may allocate a memory element, deallocate a memory element, add one or more data units to cache, remove one or more data elements from cache, etc. At operation 204, the thread updates its thread counter. Updating the thread counter may include adding to or subtracting from a prior value of the local thread counter. Consider an example where the resource metric is a utilization of a global memory pool. If the thread is allocated memory locations from the global memory pool, updating the thread counter may include incrementing the thread counter by an amount equal to the number of memory elements allocated. If the memory units previously allocated to the thread are deallocated, then updating the thread counter may include decrementing the thread counter by an amount equal to the number of memory elements deallocated.

At operation 206, the thread determines if the updated value of the thread counter exceeds a thread counter threshold for that thread. The thread counter threshold indicates the portion of the allowable error in the resource metric associated with the thread. For example, as described herein, the sum of thread counter thresholds across threads that keep local thread counters indicates the total allowable error for the resource metric.

If the updated value of the thread counter is less than the thread counter threshold for the thread, the thread may continue its processing. For example, the thread may execute an additional operation causing a change in the value of the resource metric at operation 202 and continue as shown. If the updated value of the thread counter is greater than the thread counter threshold, the thread may update the global value of the resource metric. For example, at operation 208, the thread may send an updated thread counter value 205 to the global resource manager. The thread resets the thread counter at operation 209. Resetting the thread counter may include setting its value to zero. For example, because the previous updated value of the thread counter was used to update the global value for the resource metric, the thread may no longer be responsible for any deviation from the global value of the resource metric.

Figure 3:
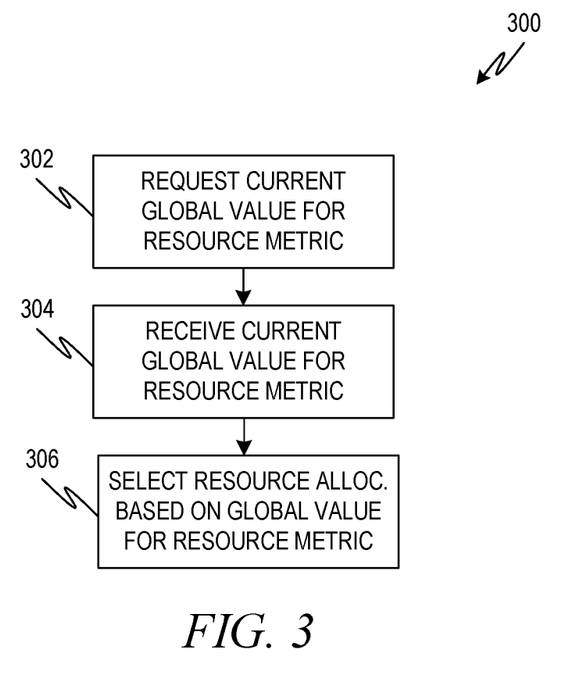
FIG. 3 is a flow chart showing one example of a process flow that may be executed by a thread to utilize the global value of a resource metric.

The global resource manager receives the updated thread counter value 205 at operation 210 and updates the global value at operation 212. Updating the global value may include adding to or subtracting from the global value an amount equal to the updated thread counter value 205. FIG. 3 is a flow chart showing one example of a process flow 300 that may be executed by a thread to utilize the global value of a resource metric. For example, the process flow 300 may be executed by one or more of the threads 104A, 104B, 104N of the environment 100. At operation 302, the thread requests a current global value of the resource metric. For example, the thread may query a global resource manager, which may store the global value for the resource metric. In another example, the thread queries a cache or other memory location associated with the thread where the thread has stored a cached copy of the global value for the resource metric that was previously received. At operation 304, the thread receives the global value for the resource metric.

At operation 306, the thread selects a resource allocation based on the global value for the resource metric. For example, the thread chooses to allocate or deallocate a memory or other storage location based on the global value. Consider an example in which the thread utilizes memory elements from a global memory pool and the resource metric is a utilization of the global memory pool. If the global value for the utilization is high, the thread may determine to remove certain data from cache at the global memory pool. If the global value for the utilization is low, the thread may determine to cache additional data. In some examples, the thread is programmed to consider the allowable error. For example, if a global memory pool includes 100 GB and the allowable error is 1 GB, the thread may take this into account in its allocation or deallocation decision. In some examples, the thread may assume the worst case error. For example, if the resource utilization is a storage utilization and the thread is considering whether to allocate or request additional storage, the thread may be programmed to assume that the actual utilization is greater than the global value by the allowable error.

Figure 4:
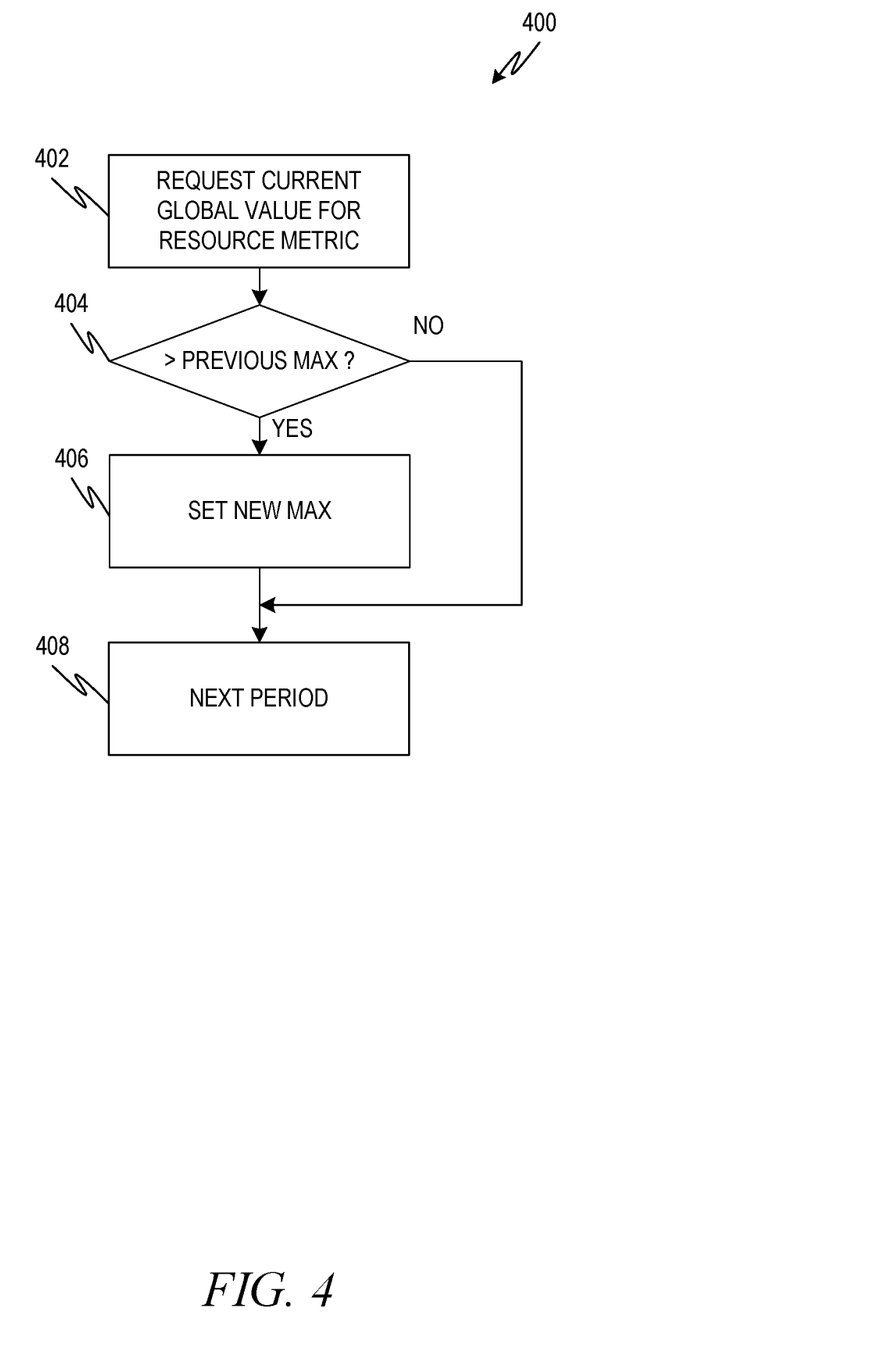
FIG. 4 is a flowchart showing one example of a process flow that may be executed a global resource manager to utilize the global value of a root resource metric to determine a derivative resource metric.

FIG. 4 is a flowchart showing one example of a process flow 400 that may be executed a global resource manager to utilize the global value of a root resource metric to determine a derivative resource metric. A derivative resource metric is a resource metric that is derived from another resource metric. For example, a high water mark or maximum value of a utilization is a derived metric, where the underlying utilization is the root metric.

At operation 402, the global resource manager requests and/or otherwise accesses the current global value for the root resource metric. In some examples, instead of having the global resource manager request the current global value for the root resource metric, the current global value for the root resource metric is pushed to the global resource manager, for example, when an updated value is received from one of the threads.

At operation 404, the global resource manager determines if the current global value is greater than a previous maximum value. (In this example, the derivative metric is a maximum value. If the derived metric is a minimum value or if another type of derived metric is used, the test at operation 404 may be different.)

If the current global value of the resource metric is greater than the previous maximum, then the global resource manager sets the value of the derivative resource metric to the current global value at operation 406 and proceeds to the next period at operation 408. If the current global value is not greater than the previous maximum, then the global resource manager proceeds to the next period at operation 408.

Figure 5:
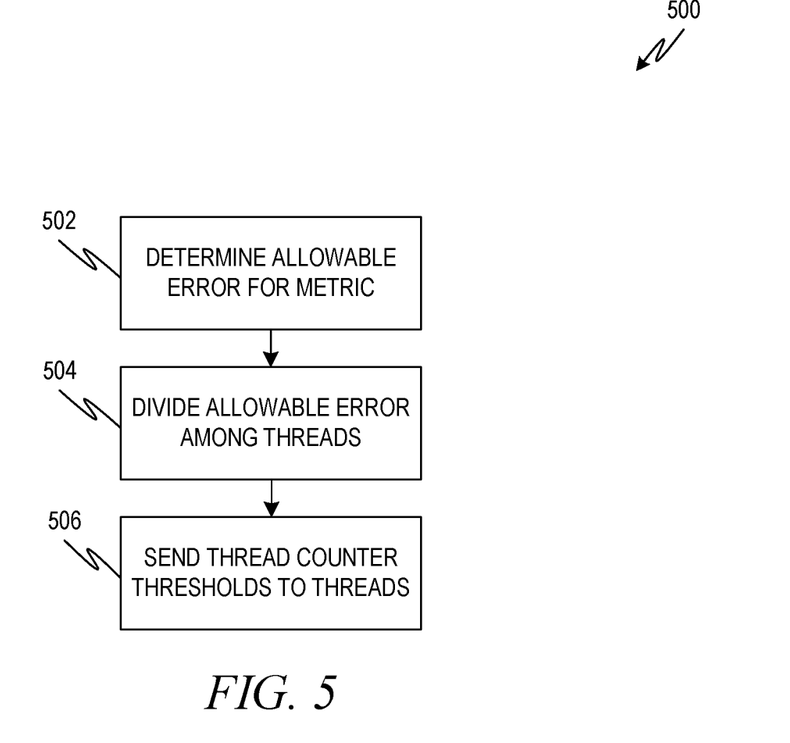
FIG. 5 is a flow chart showing one example of a process flow that may be executed, for example, by a global resource manager, to select thread counter thresholds for a set of threads.

FIG. 5 is a flow chart showing one example of a process flow 500 that may be executed, for example, by a global resource manager to select thread counter thresholds for a set of threads. At operation 502, the global resource manager determines an allowable error for the resource metric. The allowable error describes a maximum difference between the actual value of the resource metric and the global value for the resource metric. The allowable error, in some examples, is determined considering an effect on the execution of the threads. For example, the larger the allowable error, the larger the margin that threads and/or the global resource manager will use when allocating and/or deallocating resources.

At operation 504, the global resource manager divides the allowable error among threads that will keep a local thread counter. In some examples, the allowable error is divided pro rata. That is, every thread is assigned an equal portion of the allowable error. In other examples, the allowable error is divided and assigned unequally. For example, a first thread that is more active in allocating and/or deallocating resources may be assigned a larger portion of the allowable error than a second thread that is less active. At operation 506, the global resource manager sends thread counter thresholds to the threads. The thread counter threshold for each thread reflects the portion of the allowable error assigned to that thread.

Figure 6:
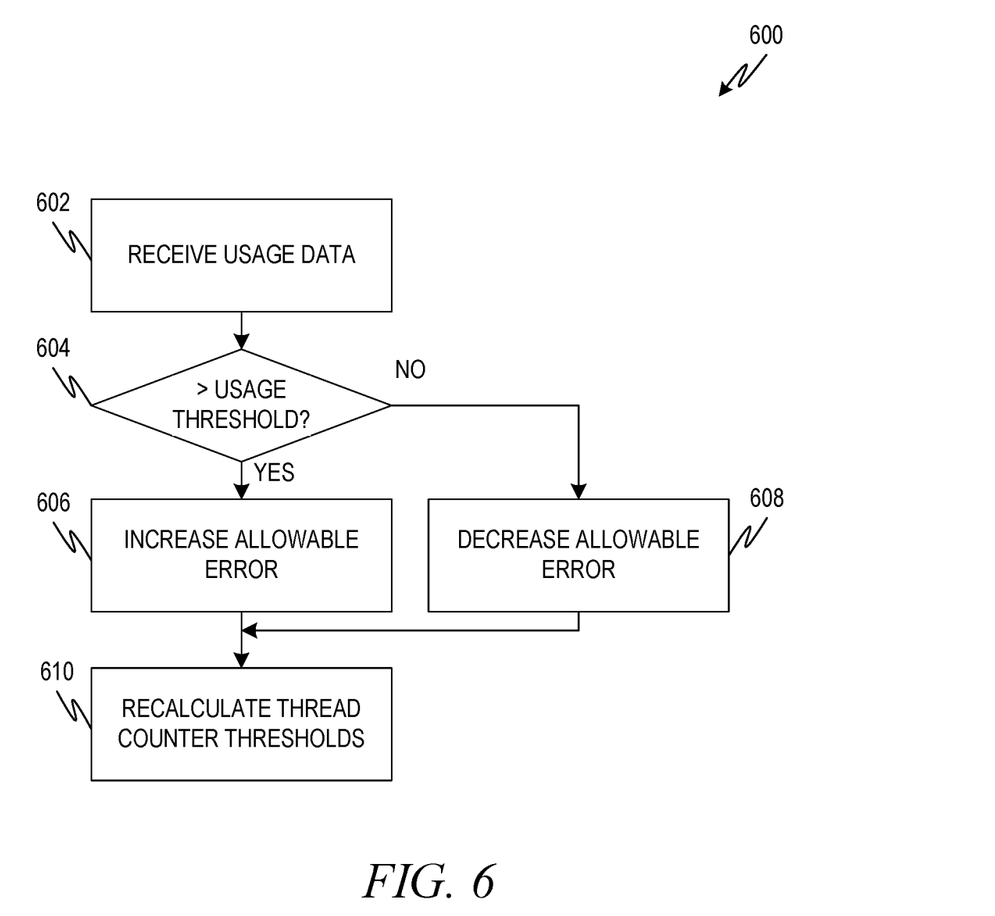
FIG. 6 is a flow chart showing one example of a process flow that may be executed, for example, by a global resource manager, to manage the performance of a computing system utilizing multi-core metadata management.

FIG. 6 is a flow chart showing one example of a process flow 600 that may be executed, for example, by a global resource manager, to manage the performance of a computing system utilizing multi-core metadata management, as described herein. At operation 602, the global resource manager receives usage data. Usage data describes the usage of components of the multi-core architecture for updating cached values of a resource metric. In some examples, usage data includes the number of times that the global value for the resource metric is updated. In some examples, usage data includes an indication of the portion of processor core cycles that are used to update the global value of the resource metric. Usage data may also include a percentage of updates to local thread counters that result in updates to the global value of the resource metric.

At operation 604, the global resource manager determines if the usage data is greater than a usage threshold. For example, the global resource manager may determine if the number of thread counter updates that result in global value updates is greater than a threshold percentage, such as 5%. In another example, the global resource manager may determine if the percentage of processor core cycles used to update the global value is greater than a threshold percentage, such as, for example, 3%.

If the usage data is greater than the threshold, then the global resource manager may increase the allowable error for the resource metric at operation 606. For example, usage data greater than the threshold indicates that the multi-core architecture is devoting greater resources to updating the global value than is desirable, for example, leaving fewer resources to perform other processing tasks. The global resource manager may increase the allowable error by any suitable increment, for example, depending on the resource that is described by the resource metric.

If the usage data is not greater than the usage threshold, the global resource manager may decrease the allowable error at operation 608. For example, if the usage data is not greater than the usage threshold, it may indicate that the multi-core architecture is devoting less than a maximum desirable level of resources to updating the global value. For example, this indicates that inefficiencies due to the allowable error may be more significant in the multi-core architecture than inefficiencies due to updating the global value. After increasing the allowable error at operation 606 or decreasing the allowable error at operation 608, the global resource manager recalculates thread counter thresholds in view of the new allowable error at operation 610. The new thread counter thresholds are provided to the threads keeping thread counters for the resource metric, for example, as described with respect to FIG. 5.

To evaluate the systems and methods described herein, a test was run utilizing a memory manager of the Adaptive Server Enterprise (ASE) product available from SAP SE of Walldorf, Germany. The memory manager was configured to satisfy memory requests of arbitrary size. The memory manager maintained free fragments of memory in "buckets" of fixed sizes, where total pool size was about 100 GB. The tracked resource metric was total pool-wide memory utilization. An online transaction processing (OLTP) load was run with sixty-four threads over a fixed time.

Three arrangements were tested. In a first arrangement, a single, global value was used to indicate the pool-wide memory utilization. When a thread allocated or deallocated memory elements from the pool, the global value was re-calculated and cached values at the threads were invalidated. In a second arrangement, each thread kept separate thread counters for the utilization metric. Threads individually updated their counters. When any thread or the memory manager was to read the value of the utilization, all of the individual thread counters were consolidated. The third arrangement is similar to the examples described herein with respect to FIGS. 1-5. Each thread kept a local thread counter for utilization metric. Each thread was assigned a thread counter threshold. Individual threads updated global values for utilization metric if the individual thread counter for that utilization metric exceeded the associated thread counter threshold. The total allowable error was 1% of a total pool size, or about 1 GB, and the error was distributed pro rata across the 64 threads.

Results of the test are shown in TABLE 1 below:

TABLE 1

| | Counter update (core cycles) | Counter aggregation (core cycles) | Total core cycles for memory allocation (% of total core cycles) | Global counter/value updated | Local counter(s) updated |
| --- | --- | --- | --- | --- | --- |
| 1 | 178K | — | 178K (4.23%) | 66,451K | — |
| 2 | 74K | 105K | 179K (4.24%) | 10,139K | 67,870K |
| 3 | 73K | — | 73K (1.73%) | 383K | 70,753K |

TABLE 1 shows, for each arrangement, the total number of core cycles used to update the utilization value across the different threads. It also shows the number of core cycles used to aggregate local counters to form a global value. Also shown is the total number of core cycles devoted to memory allocation. These cycles as a percentage of total core cycles used by the workload are indicated in parentheses. The number of times that a global value was updated and the number of times that a local counter was updated are also shown. As shown, the third arrangement reduces the total number of core cycles for memory allocation by greater than half relative to the first and second arrangements. This is primarily due to significant reduction in the number of times that the global value is updated.

Figure 7:
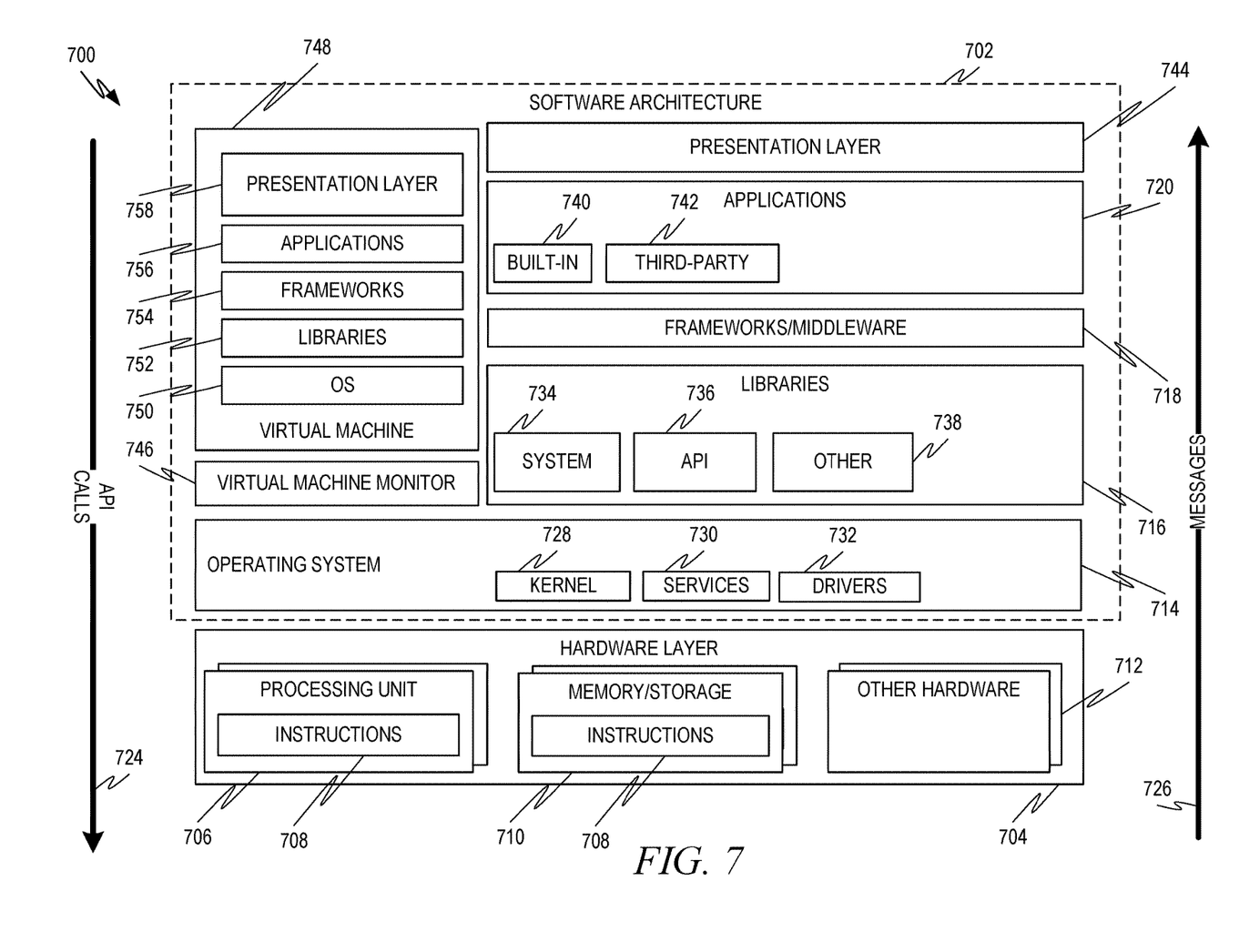
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture, and many other architectures may be implemented to facilitate the functionality described herein. A representative hardware layer 704 is illustrated and can represent, for example, any of the above referenced computing devices. In some examples, the hardware layer 704 may be implemented according to the architecture of a computer system 800 of FIG. 8.

The representative hardware layer 704 comprises one or more processing units 706 having associated executable instructions 708. The executable instructions 708 represent the executable instructions of the software architecture 702, including implementation of the methods, modules, subsystems, components, and so forth described herein. The hardware layer 704 may also include memory and/or storage modules 710, which also have the executable instructions 708. The hardware layer 704 may also comprise other hardware 712, which represents any other hardware of the hardware layer 704, such as the other hardware illustrated as part of the computer system 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and access a response, returned values, and so forth, illustrated as messages 726, in response to the API calls 724. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system 734 libraries (e.g., C standard library) that may provide functions such as memory allocation functions, string manipulation functions, mathematic functions, and the like. In addition, the libraries 716 may include API 736 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules. In some examples, the other libraries 738 may provide one or more APIs serviced by a message-oriented middleware.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system 734, APIs 736, and other libraries 738), and frameworks/middleware 718 to create user interfaces to interact with users of the system. Alternatively, or additionally, in some systems interactions with a user may occur through a presentation layer, such as the presentation layer 744. In these systems, the application/module "logic" can be separated from the aspects of the application/module that interact with a user.

Some software architectures utilize virtual machines. In the example of FIG. 7, this is illustrated by a virtual machine 748. A virtual machine creates a software environment where applications/modules can execute as if they were executing on a hardware computing device. A virtual machine is hosted by a host operating system (e.g., operating system 714) and typically, although not always, has a virtual machine monitor 746, which manages the operation of the virtual machine as well as the interface with the host operating system (e.g., operating system 714). A software architecture executes within the virtual machine, such as an operating system 750, libraries 752, frameworks/middleware 754, applications 756, and/or a presentation layer 758. These layers of software architecture executing within the virtual machine 748 can be the same as corresponding layers previously described or may be different.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Herein are set out hardware (e.g., machine) and software architectures that may be deployed, in various example embodiments.

EXAMPLES

Example 1 is a system for managing resources, comprising: a processor unit comprising a plurality of processor unit cores; and at least one machine-readable medium comprising instructions thereon that, when executed by the processor unit, cause the processor unit to perform operations comprising: allocating, by a first thread executing at a first core of the plurality of processor unit cores, a first element of a resource; incrementing, by the first thread, a first thread counter for a first metric describing the resource; determining, by the first thread, that the first thread counter is greater than a first thread counter threshold; updating a first metric global value based at least in part on the first thread counter; and resetting the first thread counter by the first thread.

In Example 2, the subject matter of Example 1 optionally includes wherein the at least one machine-readable medium further comprises instructions thereon that, when executed by the processor unit, cause the processor unit to perform operations comprising: allocating, by a second thread executing at a second core of the plurality of processor unit cores, a second element of the resource; incrementing, by the second thread, a second thread counter for the first metric; determining, by the second thread, that the second thread counter is greater than a second thread counter threshold; updating the first metric global value based at least in part on the second thread counter; and resetting the second thread counter by the second thread.

In Example 3, the subject matter of any one or more of Examples 1-2 optionally includes wherein the at least one machine-readable medium further comprises instructions thereon that, when executed by the processor unit, cause the processor unit to perform operations comprising: allocating, by the first thread, a second element of the resource; incrementing, by the first thread, the first thread counter; and determining, by the first thread, that the first thread counter is not greater than the first thread counter threshold.

In Example 4, the subject matter of any one or more of Examples 1-3 optionally includes wherein the resource is accessible by a plurality of threads including the first thread, wherein the at least one machine-readable medium further comprises instructions thereon that, when executed by the processor unit, cause the processor unit to perform operations comprising: accessing, by a resource manager executed by the processor unit, an allowable error for the first metric; and determining, by the resource manager, a plurality of thread counter thresholds based at least in part on the allowable error for the first metric, wherein the plurality of thread counter thresholds comprises the first thread counter threshold.

In Example 5, the subject matter of Example 4 optionally includes wherein a sum of the plurality of thread counter thresholds is less than the allowable error for the first metric.

In Example 6, the subject matter of any one or more of Examples 1-5 optionally includes wherein the at least one machine-readable medium further comprises instructions thereon that, when executed by the processor unit, cause the processor unit to perform operations comprising: receiving, by a resource manager executed by the processor unit, usage data describing a portion of processor unit cycles used for resource allocation; and modifying, by the resource manager, the first thread counter threshold based at least in part on the usage data.

In Example 7, the subject matter of any one or more of Examples 1-6 optionally includes wherein the resource is a global memory pool, wherein the first metric is a utilization of the global memory pool, and wherein the at least one machine-readable medium further comprises instructions thereon that, when executed by the processor unit, cause the processor unit to perform operations comprising: receiving, by the first thread and from a resource manager, a value for the first metric global value; and selecting, by the first thread, a first data unit for caching at the global memory pool based at least in part on the value for the first metric global value.

In Example 8, the subject matter of any one or more of Examples 1-7 optionally includes wherein the resource is a global memory pool, wherein the first metric is a maximum utilization of the global memory pool, and wherein the at least one machine-readable medium further comprises instructions thereon that, when executed by the processor unit, cause the processor unit to perform operations comprising: determining, by a resource manager, that a current value of the first metric global value is greater than a first metric global value previous maximum value; and setting the first metric global value previous maximum value equal to the current value.

Example 9 is a method for managing resources in a multi-core computing system, comprising: allocating, by a first thread executing at a first core of a multi-core processor unit, a first element of a resource; incrementing, by the first thread, a first thread counter for a first metric describing the resource; determining, by the first thread, that the first thread counter is greater than a first thread counter threshold; updating a first metric global value based at least in part on the first thread counter; and resetting the first thread counter by the first thread.

In Example 10, the subject matter of Example 9 optionally includes allocating, by a second thread executing at a second core of the multi-core processor unit, a second element of the resource; incrementing, by the second thread, a second thread counter for the first metric; determining, by the second thread, that the second thread counter is greater than a second thread counter threshold; updating the first metric global value based at least in part on the second thread counter; and resetting the second thread counter by the second thread.

In Example 11, the subject matter of any one or more of Examples 9-10 optionally includes allocating, by the first thread, a second element of the resource; incrementing, by the first thread, the first thread counter; and determining, by the first thread, that the first thread counter is not greater than the first thread counter threshold.

In Example 12, the subject matter of any one or more of Examples 9-11 optionally includes wherein the resource is accessible by a plurality of threads including the first thread, further comprising: accessing, by a resource manager executed by the multi-core processor unit, an allowable error for the first metric; and determining, by the resource manager, a plurality of thread counter thresholds based at least in part on the allowable error for the first metric, wherein the plurality of thread counter thresholds comprises the first thread counter threshold.

In Example 13, the subject matter of Example 12 optionally includes wherein a sum of the plurality of thread counter thresholds is less than the allowable error for the first metric.

In Example 14, the subject matter of any one or more of Examples 9-13 optionally includes receiving, by a resource manager executed by the multi-core processor unit, usage data describing a portion of processor unit cycles used for resource allocation; and modifying, by the resource manager, the first thread counter threshold based at least in part on the usage data.

In Example 15, the subject matter of any one or more of Examples 9-14 optionally includes wherein the resource is a global memory pool, wherein the first metric is a utilization of the global memory pool, further comprising: receiving, by the first thread and from a resource manager, a value for the first metric global value; and selecting, by the first thread, a first data unit for caching at the global memory pool based at least in part on the value for the first metric global value.

In Example 16, the subject matter of any one or more of Examples 9-15 optionally includes wherein the resource is a global memory pool, wherein the first metric is a maximum utilization of the global memory pool, further comprising: determining, by a resource manager, that a current value of the first metric global value is greater than a first metric global value previous maximum value; and setting the first metric global value previous maximum value equal to the current value.

Example 17 is a machine-readable medium comprising instructions thereon that, when executed by at least one processor unit, cause the at least one processor unit to perform operations comprising: allocating, by a first thread executing at a first core of the at least one processor unit, a first element of a resource; incrementing, by the first thread, a first thread counter for a first metric describing the resource; determining, by the first thread, that the first thread counter is greater than a first thread counter threshold; updating a first metric global value based at least in part on the first thread counter; and resetting the first thread counter by the first thread.

In Example 18, the subject matter of Example 17 optionally includes instructions thereon that, when executed by the at least one processor unit, cause the at least one processor unit to perform operations comprising: allocating, by a second thread executing at a second core of the at least one processor unit, a second element of the resource; incrementing, by the second thread, a second thread counter for the first metric; determining, by the second thread, that the second thread counter is greater than a second thread counter threshold; updating the first metric global value based at least in part on the second thread counter; and resetting the second thread counter by the second thread.

In Example 19, the subject matter of any one or more of Examples 17-18 optionally includes instructions thereon that, when executed by the at least one processor unit, cause the at least one processor unit to perform operations comprising: allocating, by the first thread, a second element of the resource; incrementing, by the first thread, the first thread counter; and determining, by the first thread, that the first thread counter is not greater than the first thread counter threshold.

In Example 20, the subject matter of any one or more of Examples 17-19 optionally includes wherein the resource is accessible by a plurality of threads including the first thread, and further comprising instructions thereon that, when executed by the at least one processor unit, cause the at least one processor unit to perform operations comprising: accessing, by a resource manager, an allowable error for the first metric; and determining, by the resource manager, a plurality of thread counter thresholds based at least in part on the allowable error for the first metric, wherein the plurality of thread counter thresholds comprises the first thread counter threshold.

Example Machine Architecture and Machine-Readable Medium

Figure 8:
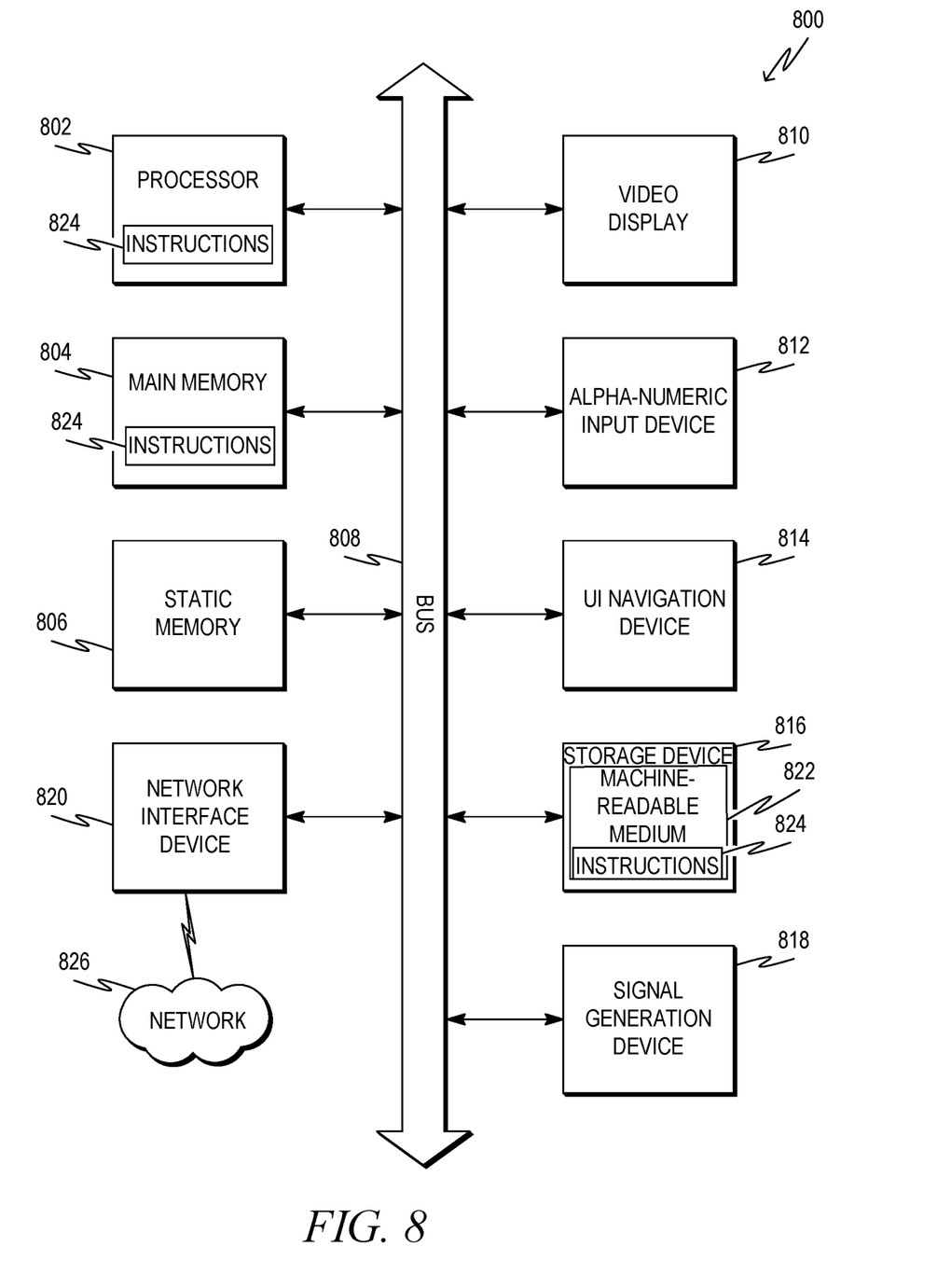
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a storage device 816, a signal generation device 818 (e.g., a speaker), and a network interface device 820.

Machine-Readable Medium

The storage device (e.g., disk drive unit) 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for managing a global memory resource used by a plurality of threads executing at a processor unit, the system, comprising:
    the processor unit comprising a plurality of processor unit cores; and
    at least one machine-readable medium comprising instructions thereon that, when executed by the processor unit, cause the processor unit to perform operations comprising:
        receiving, by a resource manager executing at the processor unit, usage data describing a portion of processor cycles at the processor unit that are used to update a first global value of a first metric describing a utilization of the global memory resource;
        determining, by the resource manager, an allowable error for the first global value of the first metric based at least in part on the usage data;
        dividing, by the resource manager, the allowable error among the plurality of threads, wherein the dividing results in a first portion of the allowable error being attributed to a first thread executing at a first core of the plurality of processor unit cores and a second portion of the allowable error being attributed to a second thread executing at a second core of the plurality of processor unit cores;
        determining, by the resource manager, a first thread counter threshold for the first thread, the first thread counter threshold being based at least in part on the first portion of the allowable error;
        determining, by the first thread, to allocate a first element of the global memory resource based at least in part on the first global value of the first metric and the allowable error for the first global value of the first metric;
        allocating the first element of the global memory resource;
        after allocating the first element of the global memory resource, incrementing, by the first thread, a first thread counter;
        determining, by the first thread, that the first thread counter is greater than the first thread counter threshold;
        updating the first global value of the first metric based at least in part on the first thread counter; and
        resetting the first thread counter by the first thread.

2. The system of claim 1, wherein the at least one machine-readable medium further comprises instructions thereon that, when executed by the processor unit, cause the processor unit to perform operations comprising:
    determining, by the resource manager a second thread counter threshold for the second thread executing at the second core of the plurality of processor unit cores, the determining based at least in part on the second portion of the allowable error attributed to the second thread;
    allocating, by the second thread, a second element of the global memory resource;
    incrementing, by the second thread, a second thread counter for the first metric;
    determining, by the second thread, that the second thread counter is greater than the second thread counter threshold;
    updating the first global value of the first metric based at least in part on the second thread counter; and
    resetting the second thread counter by the second thread.

3. The system of claim 1, wherein the at least one machine-readable medium further comprises instructions thereon that, when executed by the processor unit, cause the processor unit to perform operations comprising:
    allocating, by the first thread, a second element of the global memory resource;
    incrementing, by the first thread, the first thread counter; and
    determining, by the first thread, that the first thread counter is not greater than the first thread counter threshold.

4. The system of claim 1, wherein the global memory resource is accessible by the plurality of threads, wherein the at least one machine-readable medium further comprises instructions thereon that, when executed by the processor unit, cause the processor unit to perform operations comprising:
    accessing, by the resource manager, the allowable error; and
    determining, by the resource manager, a plurality of thread counter thresholds based at least in part on the allowable error, wherein the plurality of thread counter thresholds comprises the first thread counter threshold.

5. The system of claim 4, wherein a sum of the plurality of thread counter thresholds is less than the allowable error.

6. The system of claim 1, wherein the at least one machine-readable medium further comprises instructions thereon that, when executed by the processor unit, cause the processor unit to perform operations comprising:
    receiving, by the resource manager, second usage data describing a portion of processor unit cycles used for resource allocation; and modifying, by the resource manager, the first thread counter threshold based at least in part on the second usage data.

7. The system of claim 1, wherein the global memory resource is a global memory pool, wherein the first metric is a utilization of the global memory pool, and wherein the at least one machine-readable medium further comprises instructions thereon that, when executed by the processor unit, cause the processor unit to perform operations comprising:
receiving, by the first thread and from the resource manager, a value for the first global value of the first metric; and
selecting, by the first thread, a first data unit for caching at the global memory pool based at least in part on the value for the first global value of the first metric.

8. The system of claim 1, wherein the global memory resource is a global memory pool, wherein the first metric is a maximum utilization of the global memory pool, and wherein the at least one machine-readable medium further comprises instructions thereon that, when executed by the processor unit, cause the processor unit to perform operations comprising:
determining, by the resource manager, that a current value of the first global value of the first metric is greater than a first global value of a first metric previous maximum value; and
setting the first global value of the first metric previous maximum value equal to the current value.

9. A method for managing a global memory resource used by a plurality of threads executing at a processor unit comprising a plurality of processor unit cores, the method comprising:
receiving, by a resource manager executing at a multi-core processor unit, usage data describing a portion of processor cycles at the processor unit that are used to update a first global value of a first metric describing a utilization of the global memory resource;
determining, by the resource manager, an allowable error for the first global value of the first metric based at least in part on the usage data;
dividing the allowable error among the plurality of threads, wherein the dividing results in a first portion of the allowable error being attributed to a first thread executing at a first core of the plurality of processor unit cores and a second portion of the allowable error being attributed to a second thread executing at a second core of the plurality of processor unit cores;
determining, by the resource manager, a first thread counter threshold for the first thread, the first thread counter threshold based at least in part on the first portion of the allowable error;
determining, by the first thread, to allocate a first element of the global memory resource based at least in part on the first global value of the first metric and the allowable error for the first global value of the first metric;
allocating, by the first thread, the first element of the global memory resource;
after allocating the first element of the global memory resource, incrementing, by the first thread, a first thread counter for the first metric;
determining, by the first thread, that the first thread counter is greater than the first thread counter threshold;
updating the first global value of the first metric based at least in part on the first thread counter; and
resetting the first thread counter by the first thread.

10. The method of claim 9, further comprising:
determining, by the resource manager, a second thread counter threshold for the second thread executing at a second core of the multi-core processor unit, the determining based at least in part on the second portion of the allowable error attributed to the second thread;
allocating, by the second thread, a second element of the global memory resource;
incrementing, by the second thread, a second thread counter for the first metric;
determining, by the second thread, that the second thread counter is greater than second thread counter threshold;
updating the first global value of the first metric based at least in part on the second thread counter; and
resetting the second thread counter by the second thread.

11. The method of claim 9, further comprising:
allocating, by the first thread, a second element of the global memory resource;
incrementing, by the first thread, the first thread counter; and
determining, by the first thread, that the first thread counter is not greater than the first thread counter threshold.

12. The method of claim 9, wherein the global memory resource is accessible by the plurality of threads, further comprising:
accessing, by the resource manager, an allowable error for the first metric; and
determining, by the resource manager, a plurality of thread counter thresholds based at least in part on the allowable error, wherein the plurality of thread counter thresholds comprises the first thread counter threshold.

13. The method of claim 12, wherein a sum of the plurality of thread counter thresholds is less than the allowable error.

14. The method of claim 9, further comprising:
receiving, by the resource manager, second usage data describing a portion of processor unit cycles used for resource allocation; and
modifying, by the resource manager, the first thread counter threshold based at least in part on the second usage data.

15. The method of claim 9, wherein the global memory resource is a global memory pool, wherein the first metric is a utilization of the global memory pool, further comprising:
receiving, by the first thread and from the resource manager, a value for the first global value of the first metric; and
selecting, by the first thread, a first data unit for caching at the global memory pool based at least in part on the value for the first global value of the first metric.

16. The method of claim 9, wherein the global memory resource is a global memory pool, wherein the first metric is a maximum utilization of the global memory pool, further comprising:
determining, by the resource manager, that a current value of the first global value of the first metric is greater than a first global value of a first metric previous maximum value; and
setting the first global value of the first metric previous maximum value equal to the current value.

17. A non-transitory machine-readable medium comprising instructions thereon that, when executed by at least one processor unit, cause the at least one processor unit to perform operations comprising:
receiving, by a resource manager executing at a multi-core processor unit comprising a plurality of processor unit cores, usage data describing a portion of processor cycles at the multi-core processor unit that are used to update a first global value of a first metric describing a utilization of a global memory resource;

determining, by the resource manager, an allowable error for the first global value of the first metric based at least in part on the usage data;

dividing the allowable error among a plurality of threads executing at the multi-core processor unit, wherein the dividing results in a first portion of the allowable error being attributed to a first thread executing at a first core of the multi-core processor unit and a second portion of the allowable error being attributed to a second thread executing at a second core of the multi-core processor unit;

determining, by the resource manager, a first thread counter threshold for the first thread, the first counter threshold based at least in part on the portion of the allowable error;

determining, by the first thread, to allocate a first element of the global memory resource based at least in part on the first global value of the first metric and the allowable error for the first global value of the first metric;

allocating, by the first thread, the first element of a resource;

after allocating the first element of the global memory resource, incrementing, by the first thread, a first thread counter for the first metric describing the resource;

determining, by the first thread, that the first thread counter is greater than the first thread counter threshold;

updating the first global value of the first metric based at least in part on the first thread counter; and resetting the first thread counter by the first thread.

18. The machine-readable medium of claim 17, further comprising instructions thereon that, when executed by the at least one processor unit, cause the at least one processor unit to perform operations comprising:

determining, by the resource manager, a second thread counter threshold for the second thread executing at a second core of the multi-core processor unit, the determining based at least in part on a second portion of the allowable error attributed to the second thread;

allocating, by the second thread, a second element of the global memory resource;

incrementing, by the second thread, a second thread counter for the first metric;

determining, by the second thread, that the second thread counter is greater than second thread counter threshold;

updating the first global value of the first metric based at least in part on the second thread counter; and resetting the second thread counter by the second thread.

19. The machine-readable medium of claim 17, further comprising instructions thereon that, when executed by the at least one processor unit, cause the at least one processor unit to perform operations comprising:

allocating, by the first thread, a second element of the global memory resource;

incrementing, by the first thread, the first thread counter; and determining, by the first thread, that the first thread counter is not greater than the first thread counter threshold.

20. The machine-readable medium of claim 17, wherein the global memory resource is accessible by the plurality of threads, and further comprising instructions thereon that, when executed by the at least one processor unit, cause the at least one processor unit to perform operations comprising:

accessing, by the resource manager, an allowable error for the first metric; and determining, by the resource manager, a plurality of thread counter thresholds based at least in part on the allowable error for the first metric, wherein the plurality of thread counter thresholds comprises the first thread counter threshold.

\* \* \* \* \*